Dec. 12, 1939.    N. E. GEE    2,182,803
FLEXIBLE DRIVE
Filed Oct. 22, 1936    2 Sheets-Sheet 2
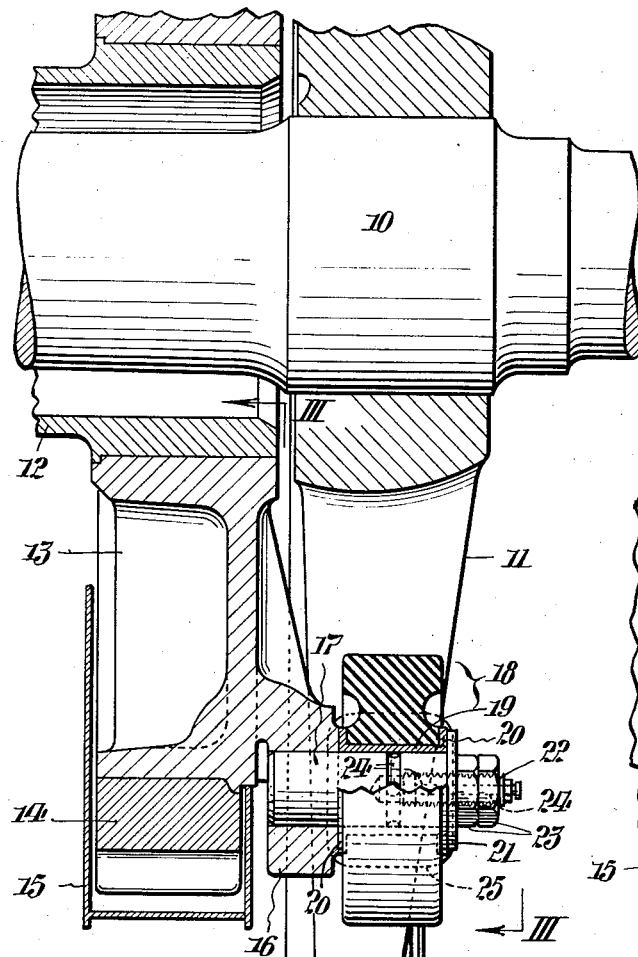
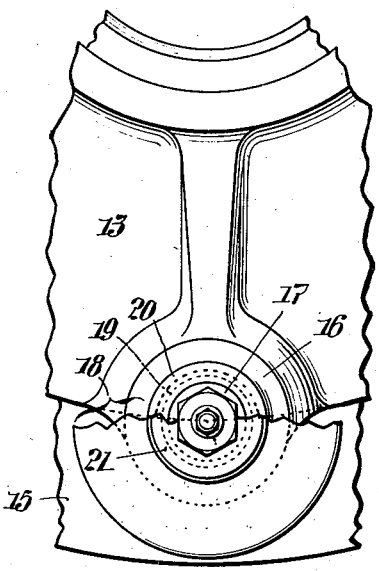
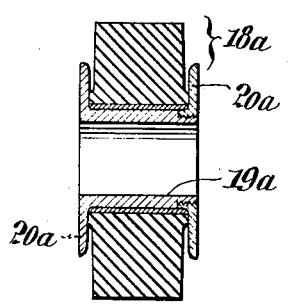
INVENTOR:
Norman E. Gee,
ATTORNEYS.

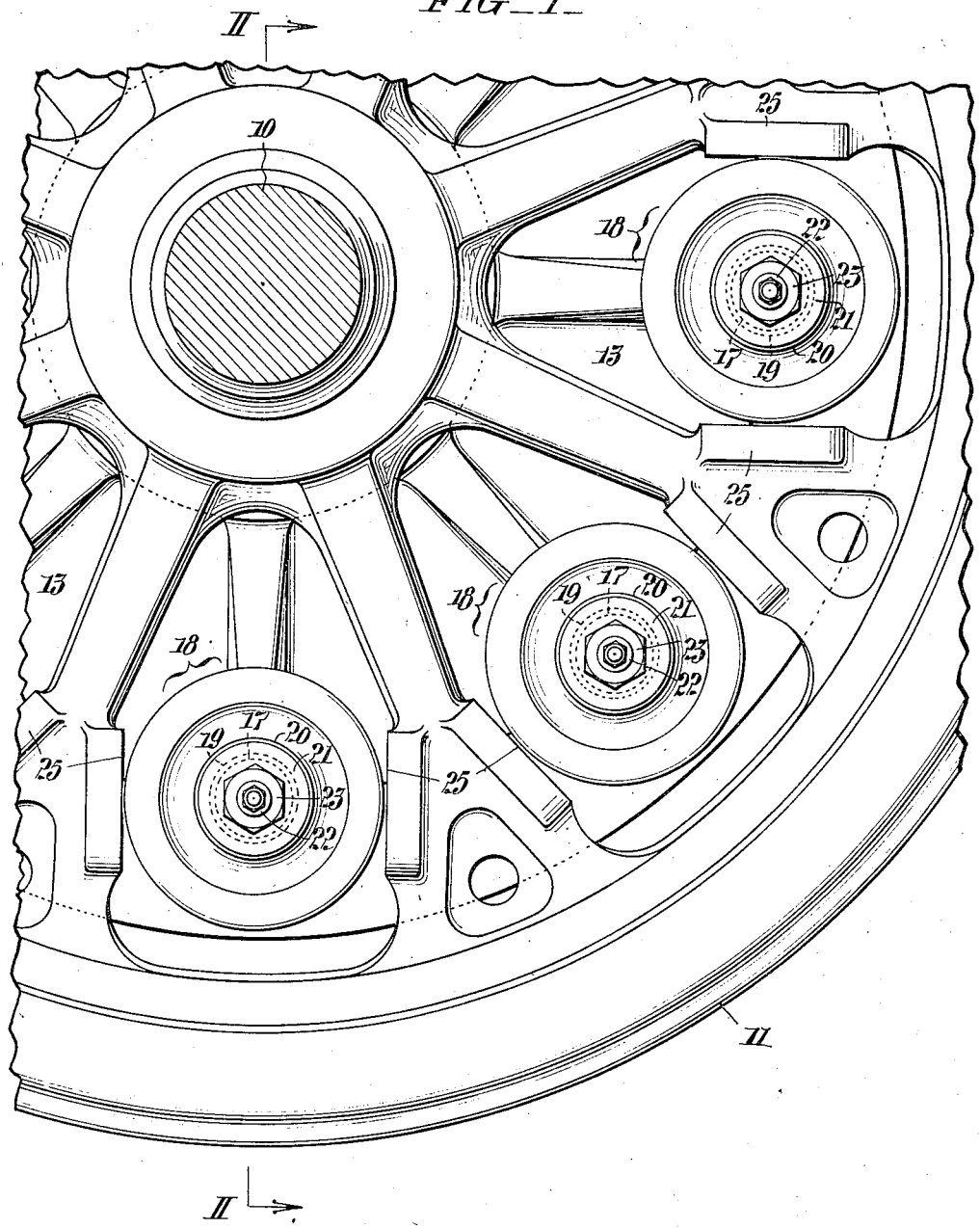

Patented Dec. 12, 1939

2,182,803

UNITED STATES PATENT OFFICE 2,182,803

FLEXIBLE DRIVE

Norman E. Gee, Altoona, Pa.

Application October 22, 1936, Serial No. 107,023

7 Claims. (Cl. 64—27)

This invention relates to a flexible drive and has special application to quill drives of the type used on electric locomotives for transmitting the torque of the driving motor to the locomotive driving wheels.

Heretofore various types of driving connections have been employed on electric locomotives, but so far as I am aware, there has not yet been produced a simple dependable drive which can be operated for a considerable length of time without requiring undue attention, repair or replacement of parts.

Accordingly, the principal object of my invention is to provide a flexible drive which is characterized by simplicity of construction and dependability of operation and which can be used to advantage on electric locomotives, enabling such locomotives to be operated over long distances, say, one hundred thousand miles, and in all kinds of service, with only the usual running inspection.

A more specific object of the invention is to provide a quill drive for electric locomotives or the like wherein the connecting drive unit between the quill and the wheels to be driven has capacity for revolving bodily about the quill center, and such connecting drive unit has additional capacity for rotation about its own axis. In one preferred form of the invention such connecting unit is circular in shape and has a rolling contact with parts associated with the wheels to be driven. In other preferred forms of the invention various means are employed, as hereinafter more fully explained, for permitting rolling of the locomotive frame on its spring gear without causing sliding frictional contact between the connecting drive unit and the wheels to be driven.

Other objects and advantages characteristic of my invention will become more fully apparent from the description hereinafter set forth of one embodiment or example of the invention, together with certain modifications thereof, having reference to the accompanying drawings. Of the drawings:

Fig. I represents a fragmentary side elevation of my improved flexible drive applied to a locomotive driving gear center, and illustrates the manner in which the rotatable drive units coact with parts of the driving wheel of the locomotive.

Fig. II represents a cross section of the same, taken as indicated by the lines II—II of Fig. I.

Fig. III represents a portion of the main driving gear center, a portion of the driving unit, and the driving pin carrying the unit, together with means for securing the driving unit on the driving pin, the view being taken as indicated by the lines III—III of Fig. II.

Fig. IV represents a cross section of a modified form of driving unit.

This invention, although it may be applied to various types of drives, is particularly applicable to electric locomotives which have the main driving motors positioned on the main frame of the locomotive and the torque of the motors delivered through flexible means to the driving wheels. In thus applying this new flexible driving gear to a modern electric locomotive, no change is contemplated in the main driving motors, the main frame of the locomotive, quill or gears that transfer the motor torque to the driving unit, but the change in design is confined to the main gear center, the driving wheels and the flexible unit between the driving gear and the driving wheels.

With reference to Figs. I, II and III of the drawings, there is shown a conventional driving axle designated by the numeral 10, and a locomotive driving wheel 11 secured to the axle 10. Surrounding the axle 10 there is a quill 12 which may be assumed to be driven by an electric motor. There is sufficient clearance between the axle 10 and the quill 12 to allow for considerable relative movement. Upon the quill 12 a gear center 13 is mounted, the gear center having gears 14 at its periphery and being housed within a gear case 15. The gear center 13 is provided with a plurality of projecting members 16, each having machine faces into which a driving pin 17 is pressed.

Rotatably mounted upon each pin 17 is a connecting drive unit designated at 18. In the example illustrated in Figs. I, II and III, the drive unit 18 is circular in form, is of resilient material, such as rubber, and has a bushing 19 rotatably surrounding the driving pin 17. Preferably the bushing 19 is provided with collars 20 at both ends thereof. One of the collars 20 may comprise a flange forming an integral part of the bushing, and the other collar may comprise a threaded disc removably mounted upon the bushing. The collars 20 serve to reduce the wear on the resilient drive unit. Each driving pin 17 is further provided with an annular washer 21, and a threaded pin 22 which is centrally disposed within the driving pin and carries a plurality of nuts 23 used for securing the drive unit 18 in position on the driving pin 22. Desirably each driving pin 17 and each securing pin 22 are provided with channels 24 through which a lubricant may be applied and distributed to the wearing surfaces between the bushing 19 and the driving pin 17, such lubricant channels 24 being clearly shown in Fig. II. It will be observed that each connecting drive unit 18 is positioned in direct line with and between spokes of the locomotive driving wheel 11. Adjacent to the top of each spoke at either side thereof, driving pads 25 are employed. In the examples shown in Figs. I, II and III, such pads 25 are formed as an integral part of the driving wheel 11, and each drive unit 18 has a rolling contact with a smooth surface of the pad which it engages.

The operation of the apparatus shown in Figs. I, II and III, as applied to an electric locomotive is as follows: It may be assumed that driving motors, usually two in number, are positioned on the main frame of a locomotive above each driving axle 10, and that the weight of the frame, the main motors, and the auxiliary equipment is carried by spring gear and transferred through main driving boxes to the driving axle 10 and thence through the locomotive driving wheels 11 to the rails of the road bed. Vertical movement may thus occur between the main frame which is carried by the flexible spring gear and the driving wheels which engage the rails, and the design of the present flexible drive takes care of such vertical movement. When the connecting drive units 18 engage the driving pads 25 and the locomotive springs are deflected due to uneven track, the drive units 18 being carried indirectly by the main spring rigging arrangement of the locomotive revolve bodily about the axis of the quill 12, which is always substantially coincident with the axis of the driving axle 10, and rotate about their own axes with rolling contact at the smooth surfaces of the pads 25. Likewise when the locomotive springs rebound, the load on the spring rigging is raised and the drive units 18 are caused to rotate in the opposite direction upon the driving pads 25. When the current in the motor fields is reversed, the direction in which the main driving gear revolves is reversed, and the opposite face of each drive unit 18 will then engage the pad 25 on the opposite side of the opening in the driving wheel, as will be clearly apparent from Fig. I of the drawings.

In the example illustrated and described above, each connecting drive unit 18 is shown as being constructed of rubber and adapted to relieve the motors of undue shocks and permit of the necessary deflections due to rough track and inaccurate concentric alignment between the quill 12 and driving axle 10. Obviously the driving units, under conditions where space permits, may comprise pneumatic tires, similar to truck tires, but where space does not permit, the solid form illustrated herein is preferable.

In Fig. IV there is shown a modified form of connecting drive unit 18a mounted upon a bushing 19a. In this arrangement a solid rubber disc is employed with its hub portion laterally expanded and firmly engaged at each side by relatively large flange elements or collars 20a.

It will be apparent that in the example of my invention described and illustrated herein, the connecting drive unit through which torque is transmitted from the motor of an electric locomotive to the driving wheels is characterized by capacity to revolve bodily about the axis of the quill and characterized additionally by the capacity to rotate about its own axis. By employing a drive unit of this character, in conjunction with resilient means associated either with the drive unit or with the driving wheel of the locomotive, it is possible to reduce very considerably the factor of wear at the critical points where the drive unit engages the wheel to be driven, and thus it is possible to obtain a strong dependable drive which does not require frequent inspection or repair or replacement of parts.

Throughout this specification the wheels of the locomotive which engage the rails have been referred to as the "driving wheels", because they serve to drive the locomotive, but such wheels are in reality the driven members of the combination of elements described and illustrated herein, and they are referred to as such in the claims which follow.

While I have described an example of my invention, it will be apparent to those skilled in the art that various changes and modifications may be made without departing from the spirit or scope of the invention as defined in the annexed claims, and it will also be apparent that the invention is not confined in its application to use with a quill drive for electric locomotives.

Having thus described my invention, I claim:

1. In combination with a drive member and a driven member, which move concentric to each other, cylindrical resilient drive units positioned on trunnions which protrude from the face of the drive member, a spool carrying each of the rotatable drive units, inside and outside flanges of the spool, divergent inside flange faces with rounded edges, and means for placing and removing the spool from the drive unit.

2. In combination with a flexible driving gear, a drive member, a driven member, integral equally spaced protruding pins on the face of the driving member; a rotatable resilient driving unit positioned on each protruding pin; a combined spool and protective shield for the driving unit, divergent inside faces for the spool and a cavity on either side of the spool, into which the resilient unit can be compressed without injury when transmitting torque from the driving member to the driven member.

3. In combination with a flexible drive for electric locomotives, a driving member; a driven member; a plurality of spokes in the driven member; an opening in the driven member between each of the spokes; an engaging face on each side of each spoke; pins positioned on the face of the driving member, each pin protruding into the center of the opening between the spokes of the driven member and a rotatable spool having outward diverging end walls which act as a protective shield; a resilient drive unit positioned on the spool with a cavity on either side of the drive unit between the face of the unit and the inside face of the spool into which the drive unit is free to expand when transmitting torque.

4. In combination with a flexible drive for electric locomotives, a drive member, a driven member, means for transmitting torque from the drive member to the driven member when each member rotates either concentric or eccentric to each other; a rotatable resilient unit through which the torque is transmitted in either direction; a spool carrying the resilient unit, and a cavity between the shield and the face of the resilient unit into which the unit may expand when transmitting torque, together with means for introducing lubricant between the spool and its bearing.

5. In combination with a driving member and a driven member, an axle carried by said driving member, a bushing mounted on said axle for rotary movement, a circular resilient drive unit mounted on said bushing, and in rolling contact with said driven member for the transmission of torque, and a strengthening collar attached to each end of said bushing for providing a limited support to said resilient drive unit.

6. In combination with a driving member and a driven member, an axle carried by said driving member, a bushing mounted on said axle for rotary movement, a circular resilient drive unit mounted on said bushing, a smooth driving surface formed on said driven member with which said unit is in rolling contact for the transmission of torque, and a strengthening collar attached to each end of said bushing for providing a limited support to said resilient drive unit.

7. The invention of claim 6 wherein said drive unit is formed with a circular recess in each face to increase flexibility at an area substantially removed from the center of said drive unit.

NORMAN E. GEE.